A. H. LEIPERT.
CLUTCH.
APPLICATION FILED MAY 21, 1920.
1,400,557.
Patented Dec. 20, 1921.
Fig. 1.
Fig. 2.
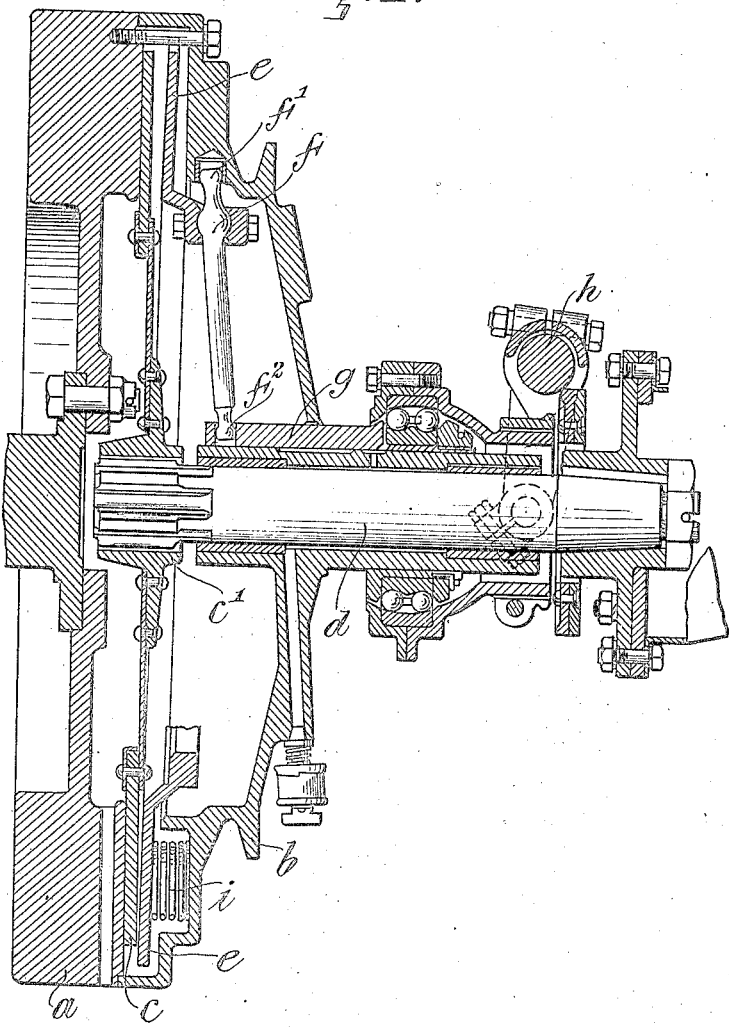
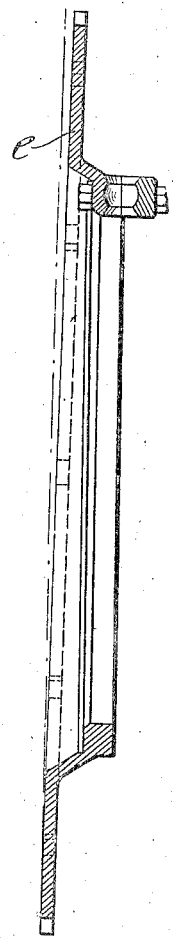
WITNESS
Geo Schwartz
INVENTOR
August H. Leipert
BY
Redding & Greeley
ATTORNEYS

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CLUTCH.

1,400,557. Specification of Letters Patent. Patented Dec. 20, 1921.

Application filed May 21, 1920. Serial No. 383,124.

*To all whom it may concern:*

Be it known that I, AUGUST H. LEIPERT, a citizen of the United States, residing in the borough of Queens of the city of New York, in the State of New York, have invented certain new and useful Improvements in Clutches, of which the following is a specification, reference being had to the accompanying drawing, forming a part hereof.

This invention relates to disk clutches in which a pressure plate is adapted to be brought into engagement with the clutch facing for the purpose of engaging a driven element frictionally with the driving element. In clutches of this type it is the usual practice to effect this engagement by means of springs which press against the follower plate, the tension of these springs being overcome by the driver when the follower plate is disengaged to release the clutch. In engaging clutch elements it is necessary to ease the follower plate against the frictional clutch plate with great skill and care if an easy start of the vehicle is to be obtained and the parts relieved of shock and undue torsional strains. Even with the exercise of the greatest care, it is evident that when the follower plate engages the clutch face throughout and presses this facing throughout into engagement with the other element of the clutch the pick-up is bound to be unduly quick since, except for slippage between surfaces, all points are engaged simultaneously throughout the contacting faces. By the present invention it is sought to reduce the shock on the parts caused by this method of throwing the load on a stationary element at one operation, by bringing points of the engaging faces successively into contact at the time of letting in the clutch. To accomplish this result it is proposed in accordance with the present invention to incline one of the contacting faces with relation to another so that first one side is engaged and then the other. It will appear to one skilled in the art that many different ways of effecting this relative inclination may be employed, but one such way which is satisfactory has been illustrated in the accompanying drawing. In this case the face of the follower plate is machined at an angle to the vertical, but sufficient lost motion is provided in the associated parts to permit this follower plate to tilt when the clutch is fully in and conform to the vertical face of the disk which it engages. Reference is to be had to the accompanying drawing for a description of the illustrated embodiment in which—

Figure 1 is a view in vertical section of a clutch of well known design constructed in accordance with the invention.

Fig. 2 is a view in vertical section of the improved follower plate showing the inclined face.

One well known type of clutch with which this invention is particularly useful is illustrated in the figures of the drawing and includes generally as clutch elements a wheel $a$, which may be the fly-wheel to which is secured the clutch casing $b$. The face of the fly-wheel $a$ is adapted to be engaged by a friction disk $c$ mounted on a hub $c'$ which is keyed on a driven shaft $d$. The clutch facing $c$ is adapted to be brought into operative engagement with the face of the fly-wheel $a$ by means of a movable presser plate or follower plate $e$ mounted on radial arms, one of which is indicated at $f$. One end $f'$ of each of these arms $f$ rests slidably in a recess in the inner wall of the housing $b$ and the other end $f^2$ is engaged somewhat loosely by a slidable finger $g$ extending through the clutch housing and adapted to be reciprocated through operative connections extending to a rock shaft $h$, all in a manner well known. The rock shaft $h$ is usually actuated by means of a foot pedal under the control of the driver. The follower plate $e$ is pressed into engagement with the clutch facing $c$ so as to bring the latter into driving contact with the face of the fly-wheel $a$ by means of a plurality of springs supported in the housing $b$, one of these springs being indicated at $i$.

It has been the established practice to machine up all of the elements of the clutch and to so mount them that when the springs $i$ are permitted to act they will press the follower plate $e$ uniformly into contact with the clutch facing $c$ at all points and simultaneously engage the clutch facing $c$ at all points with the face of the clutch element $a$. This action is one intended to bring the entire load on the motor in a single operation. The resulting strain and unpleasant shocks are usually reduced so far as possible by the skill of the driver, the best practice being to ease the follower plate e into engagement with the clutch facing in such manner as to let the clutch slip somewhat and take hold slowly first. This results in great wear of the clutch facing and does not give the best pick-up. In accordance with the present invention it is proposed to so construct or mount the elements of the clutch with relation to one another as not to permit all points of the contacting surfaces to be brought into engagement simultaneously, but to insure the successive engagement of different points of these faces when the clutch is eased in. One way of bringing this about is by machining off the face of the follower plate from the truly vertical so that one portion thereof, under the influence of the springs i, will engage a portion of the clutch facing c thereby pressing it against the clutch element a before other portions are brought together. As successive points engage a slow and uniform pick-up will be obtained and the load applied gently. As the follower plate continues its travel under the influence of the springs i a greater number of points will be successively brought into engagement as between the clutch elements until finally the plate e will tilt somewhat so as to bring its face into a substantially vertical plane and in engagement throughout with the clutch facing c. This tilting will be permitted in the illustrated embodiment by the loose connections between the arms f and the clutch housing b and the operating fingers g. All violent shocks by the two sudden application of the load are eliminated by the construction described and too great a premium is not put on the skill of the operator since when the clutch is let in quickly the same successive engagement of points throughout the contacting faces will be gone through before the entire surface contact is effected.

It will be evident to one skilled in the art that other means of bringing about the same gradual engagement between the clutch elements can be employed with some degree of effectiveness. For instance, it is possible that the springs i might be of different strengths so as to operate successively in effecting complete engagement. Again, the clutch lining c might be tilted somewhat so as to engage with the element a at different points successively before complete engagement throughout is brought about.

The spirit of the invention will appear from the scope which is intended to be afforded to this invention by the appended claims.

I claim as my invention—

1. A clutch comprising a driving member, a friction clutch element, a shaft supporting it, the proximate faces of the driving member and friction clutch element being in planes at right angles to the axis of the shaft, a plate movable to press all of said elements into driving engagement, said plate having its face inclined to the axis of the shaft to effect the surface engagement of said members throughout gradually, and means to mount the plate tiltably.

2. A disk clutch comprising a driving member, a driven member, a friction clutch disk carried thereby and a presser plate having its face in proximity to the clutch disk machined to a plane at an angle to the plane of the proximate face of the clutch element and movable to bear against the face of the clutch element throughout.

This specification signed this 13th day of May, A. D. 1920.

AUGUST H. LEIPERT.